July 14, 1959     M. A. ORDORICA     2,894,592
VEHICLE SUSPENSION SYSTEM
Filed Oct. 1, 1956     2 Sheets—Sheet 1
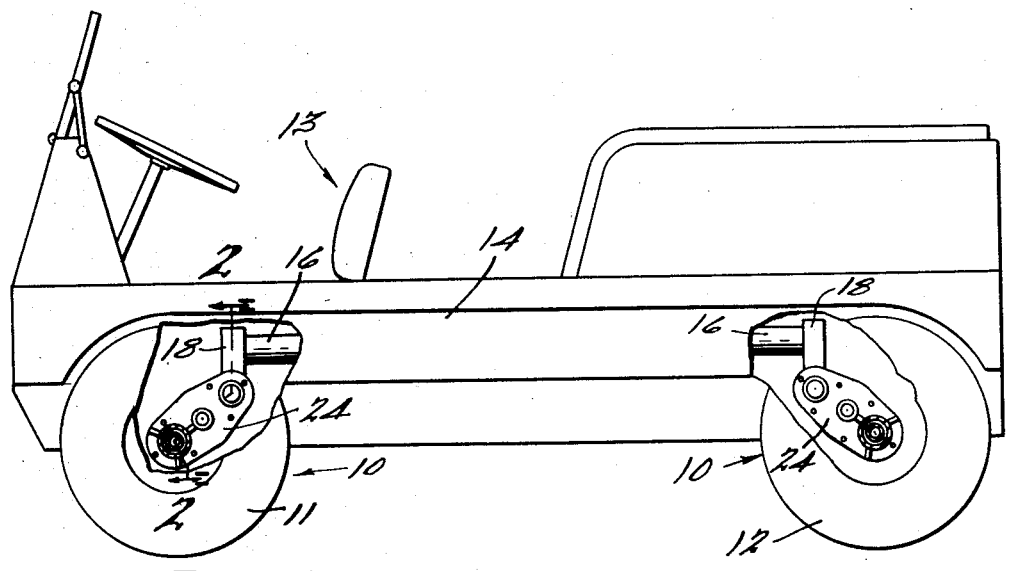
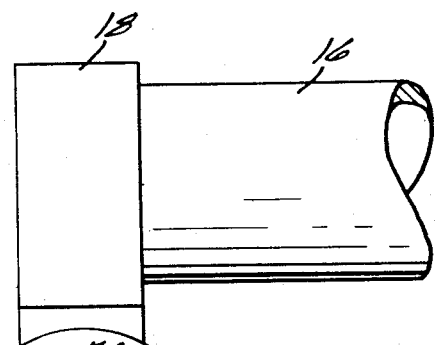
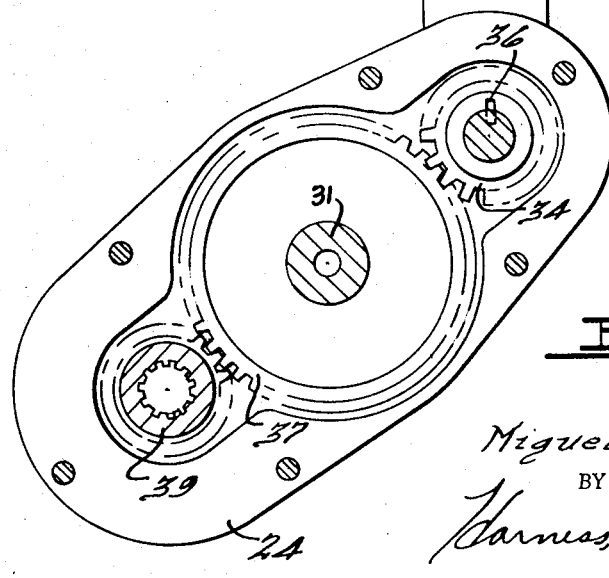
INVENTOR.
Miguel A. Ordorica.
BY
Harness, Dickey & Pierce
ATTORNEYS.

July 14, 1959  M. A. ORDORICA  2,894,592
VEHICLE SUSPENSION SYSTEM
Filed Oct. 1, 1956  2 Sheets-Sheet 2
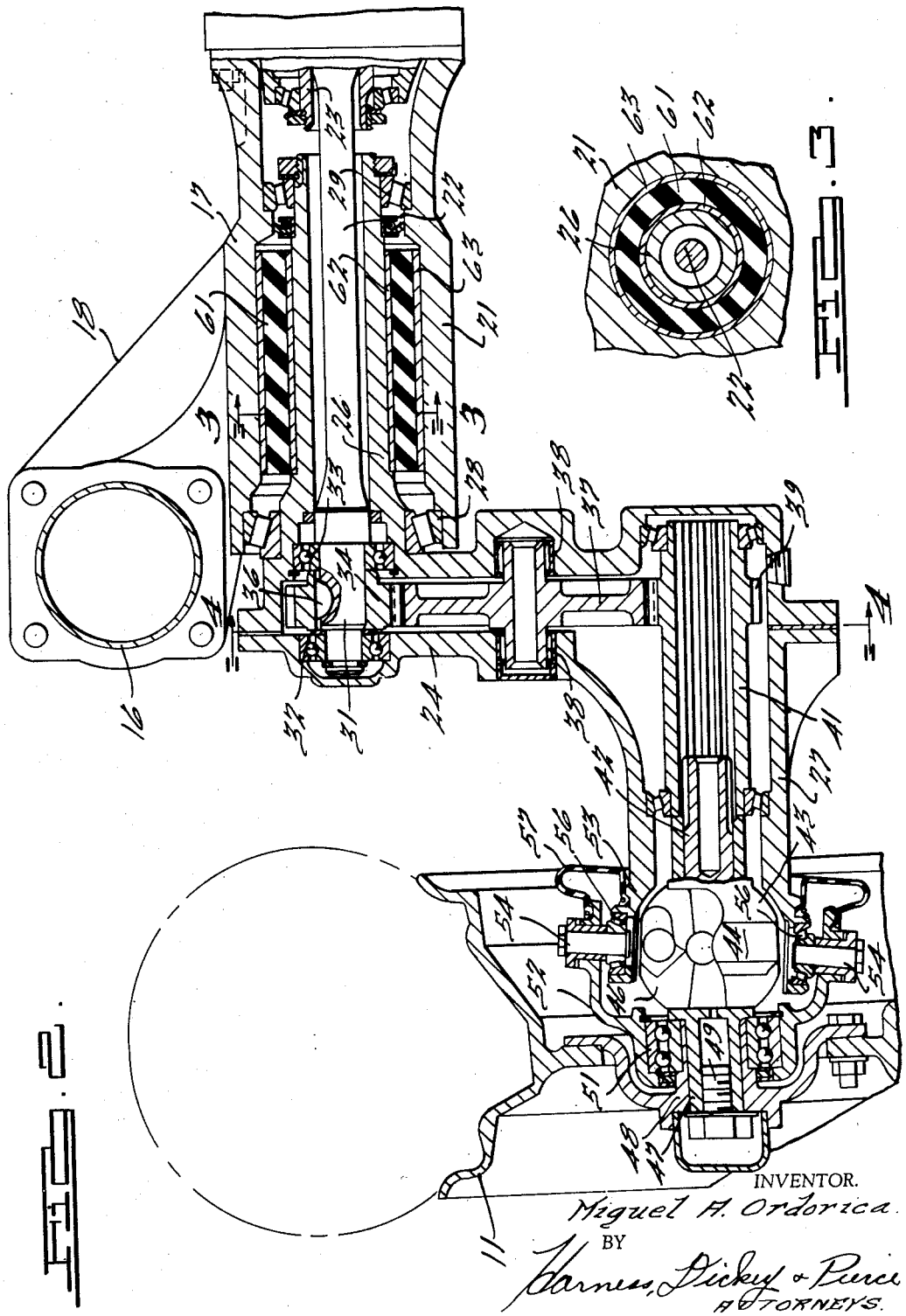
INVENTOR.
Miguel A. Ordorica
BY
Harness, Dickey & Pierce
ATTORNEYS.

United States Patent Office 2,894,592
Patented July 14, 1959

2,894,592

VEHICLE SUSPENSION SYSTEM

Miguel A. Ordorica, Toledo, Ohio, assignor, by mesne assignments, to Bank of America National Trust and Savings Association, a national banking association Application October 1, 1956, Serial No. 613,009

1 Claim. (Cl. 180—45)

This invention relates generally to automotive vehicles and more particularly to wheel suspension apparatus for automotive vehicles.

Vehicles of the type designed particularly for transporting supplies, cargo or personnel over rough or unusual terrain are commonly provided with a body mounted directly on the vehicle running gear. No satisfactory wheel suspension apparatus, for absorbing the shock of terrain irregularities, has been available which would stand up under the rugged use to which such vehicles are subjected.

It is an object of this invention, therefore, to provide improved wheel suspension apparatus for vehicles.

A further object of this invention is to provide vehicle wheel suspension apparatus which is combined with the wheel drive mechanism.

Another object of this invention is to provide vehicle wheel suspension apparatus which is associated with the housings for the wheel drive gearing for yieldably resisting movement of the wheels in up and down directions relative to the vehicle body.

A further object of this invention is to provide vehicle wheel suspension apparatus in which the front and rear wheels on opposite sides of the vehicle are provided with cooperating suspension apparatus so that the wheels on the same side of the vehicle have a dampening action on the up and down movement of each other, Still a further object of this invention is to provide vehicle wheel suspension apparatus which is simple in construction, economically applied to vehicles of the above type now in use, and efficient in operation over a prolonged service life.

Further objects, features and advantages of this invention will become apparent from a consideration of the following description when taken in connection with the accompanying drawing in which:

Fig. 1 is a side elevational view of an automotive vehicle provided with the wheel suspension apparatus of this invention with some parts broken away for better illustrating the apparatus;

Fig. 2 is an enlarged fragmentary sectional view looking substantially along the line 2—2 in Fig. 1;

Fig. 3 is a transverse sectional view as seen along the line 3—3 in Fig. 2; and

Fig. 4 is a sectional view looking substantially along the line 4—4 in Fig. 2.

With reference to the drawing, the wheel suspension apparatus of this invention, indicated generally at 10, is illustrated in Fig. 1 in assembly relation with a pair of ground wheels 11 and 12 on one side of a vehicle 13 of forward control four-wheel drive and four-wheel steer type. The vehicle 13 is particularly intended for cross country mobility and is adapted for travel over rough terrain in the transporting of personnel and cargo and includes a body 14 having a pair of tubular main frame members 16 (Figs. 1, 2 and 4), only one of which is shown, extended longitudinally of the vehicle adjacent opposite sides thereof. A pair of tubular axle housings 17, which also serve as transverse frame members and only one of which is shown, are positioned below the longitudinal frame members 16 and connected thereto by means of integral connecting web members 18.

Since the wheel suspension apparatus 10 is substantially identical for the wheels 11 and 12 on both sides of the vehicle 13, only the apparatus 10 for the front wheel 11 is illustrated in detail in the drawing and will be described in detail hereinafter.

Positioned within an end portion 21 of the frame member 17 corresponding to and positioned opposite the wheel 11 (Fig. 2) is a power transmitting shaft 22 splined to a drive shaft 23 in the member 17. A gear housing 24, corresponding to the wheel 11, is positioned outwardly of the frame member end portion 21 and inclined downwardly and forwardly therefrom. As best appears in Figs. 2 and 4, the housing 24 is integrally formed at its upper end with a tubular extension 26 projected laterally of the housing 24 in a direction inwardly of the vehicle body 14.

At its lower end, the housing 24 has a tubular extension 27 projected laterally outwardly in an opposite direction. The upper tubular extension 26 is extended within the frame member end portion 21 and rotatably supported on a pair of bearings 28 and 29 carried by the frame portion 21. The outer end 31 of the shaft 22 is in turn supported on a pair of spaced bearings 32 and 33 carried in the gear housing 24. Between the bearings 32 and 33, a first gear 34 is secured to the outer end portion of the shaft 22 by a key 36.

A second larger gear 37, supported on bearings 38 carried by the housing 24, is positioned below and meshes with the first gear 34 and also with a third gear 39 formed on a shaft 41 positioned within and extended axially of the tubular housing extension 27. Splined to the shaft 41 is a second shaft 42 which carries an element 43 of a universal joint assembly 44 preferably of the so-called constant velocity type. A second element 46 of the joint assembly 44 is secured to the inner end of an outwardly projected tubular member 47 which is in turn snugly received within a hub 48 for the wheel 11. A bolt 49 fixedly secures the tubular member 47 to the hub 48.

The wheel hub 48 is revolubly mounted on a bearing 51 carried by an annular member 52 extended about the terminal end 53 of the tubular housing extension 27. The annular member 52 carries a pair of oppositely disposed inwardly directed stub shafts 54 which are in turn supported in bearings 56, of tapered roller type, carried by the terminal end 53 of the tubular extension 27. A flexible boot 57 extends between the annular member 52 and the tubular extension 27 for keeping dust and foreign matter out of the universal joint assembly 44 and preventing leakage of lubricant from the joint assembly 44.

It is seen, therefore, that the wheel 12 is driven by the shaft 22 which transmits rotary movement to the shaft 41 through the meshing gears 34, 37 and 39. The shaft 41 in turn rotates the wheel 11 by virtue of the connection of the wheel 11 and the shaft 41 through the tubular member 47, universal joint assembly 44 and the shaft 42. During steering, which is accomplished by coordinated movement of all four wheels, the wheel 11 is swung about the joint assembly 44 and the stub shafts 54.

As best appears in Figs. 2 and 3, a sleeve 61, formed of a suitable flexible or resilient material such as rubber, is arranged about the upper tubular housing extension 26 between the bearings 28 and 29. The sleeve 61 is arranged between and securely bonded or fixed to a pair of concentric metal tubes 62 and 63 which are arranged in press fitting relations with the tubular extension 26 and the frame member end portion 21, respectively. The sleeve 61 thus acts to yieldably resist any rotation of the tubular extension member 26 within the frame member 17.

As best appears in Fig. 1, the gear housings 24 corresponding to the wheels 11 and 12 on one side of the vehicle body 14 are inclined downwardly in a diverging relation, and it is to be understood that the corresponding housings 24 on the opposite side of the vehicle body 14 are identically arranged. While the housings 24 may be arranged in a downwardly converging relation or in parallel relations inclined either downwardly and forwardly or downwardly and rearwardly of the vehicle body 14 with satisfactory results, the downwardly diverged relation illustrated in Fig. 1 is preferred since it provides the vehicle 13 with the maximum wheel base.

In the use of the vehicle 13, during travel of the vehicle over rough terrain, the body 14 is movable up and down relative to the wheels 11 and 12 with the rubber sleeves 61 for the wheels 11 and 12 acting to cushion such movement. Each time a force on a wheel 11 or 12 tends to move the wheel upwardly, the sleeve 61 corresponding to the wheel is twisted with the sleeve 61 yieldably resisting such twisting and consequently resisting similarly upward movement of the wheel. In other words, movement of a wheel 11 or 12 either up or down is accomplished only by movement of the housing 24 therefor about the corresponding power transmitting shaft 22. Manifestly any rotation of a housing extension 26 acts to similarly rotate the portion of the corresponding sleeve 61 adjacent the extension 26 while the outer portion of the sleeve 61 adjacent the frame member 17 is stationary. By virtue of the rubber construction of the sleeve 61, some such twisting takes place to provide for the cushioning action of the sleeve 61, with the natural resistance of the sleeve material to twisting providing the desired yieldable resistance to wheel movement.

Since each of the wheels 11 and 12 has a cushioning sleeve 61, the wheels for the vehicle 13 are independently supported on the body 14.

From the above description, it can be seen that this invention provides wheel suspension apparatus 10 which is combined with the wheel drive mechanism to provide an efficient shock absorbing action for the vehicle wheels. Since no reaction structure is required below the vehicle main frame, as in conventional suspension devices, the frame may be located close to the ground surface to maintain a minimum overall vehicle height. By virtue of the assembly of the yieldable rubber sleeves 61 with the gear housings 24 and the main frame members 17, an efficient yieldable resistance to up and down movement of the vehicle body 14 relative to the ground wheels 11 and 12 is provided. As a result of the unitary construction of the rubber sleeves 61, the apparatus 10 will provide the desired results under rugged use over a prolonged service life.

Although the invention has been described with respect to several embodiments thereof, it is to be understood that it is not to be so limited, since changes can be made therein which are within the scope of the invention as defined by the appended claim.

What is claimed is:

In a vehicle having a main frame which includes a pair of frame members extended transversely of the vehicle, a ground wheel positioned outwardly of each end of each of said frame members, a power transmitting shaft corresponding to and extended outwardly of each end of each of said frame members, a gear housing corresponding to and inclined downwardly from each of said power transmitting shafts, with the housings on each side of said vehicle being arranged in a downwardly diverged relation, a tubular extension on each of said housings positioned about the corresponding shaft and within a frame member to provide for pivotal movement of said housing relative to said frame member, a gear mechanism arranged within each housing in an operative relation with the corresponding shaft and wheel for driving the wheel from the shaft, resilient sleeve members positioned about said tubular extensions and arranged within said frame members, and means securing said sleeve members to said tubular extensions and said frame members for yieldably resisting said pivotal movement of said housings to provide for an individual support of said wheels on said main frame.

References Cited in the file of this patent

UNITED STATES PATENTS

| | | |
|---|---|---|
| 2,012,653 | Blackmon | Aug. 27, 1935 |
| 2,043,542 | Johnson | June 9, 1936 |
| 2,166,368 | Perron | July 18, 1939 |
| 2,172,177 | Rose | Sept. 5, 1939 |
| 2,255,365 | Poche | Sept. 9, 1941 |
| 2,371,864 | Woolson et al. | Mar. 20, 1945 |
| 2,457,400 | Roos | Dec. 28, 1948 |
| 2,552,690 | Poirier | May 15, 1951 |

FOREIGN PATENTS

| | | |
|---|---|---|
| 180,198 | Austria | Nov. 10, 1954 |
| 813,340 | France | Feb. 22, 1937 |
| 1,007,017 | France | Feb. 6, 1952 |